5930X
H. Thurber,
Washing Machine,
Patented Apr. 22, 1830.
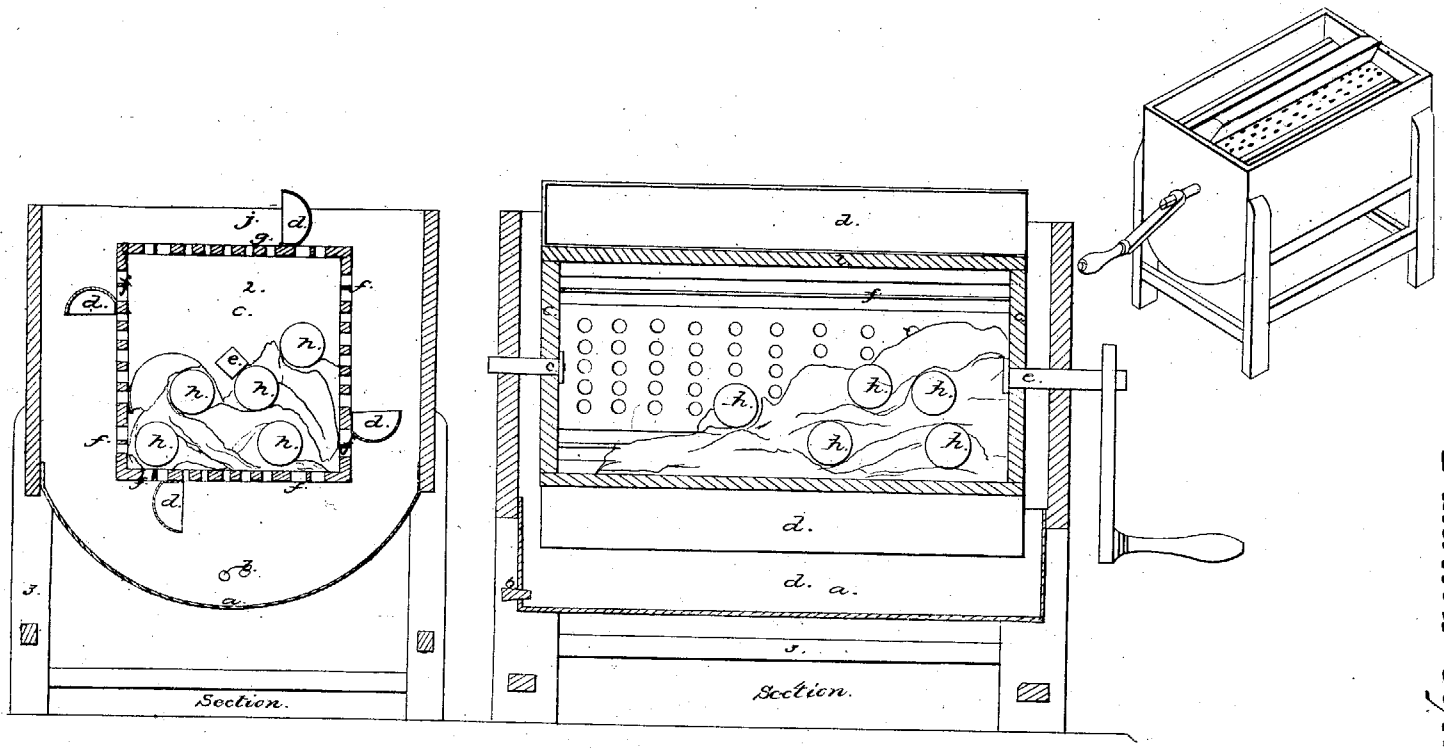

Hezekiah Thurber of the Town of [illegible] Steuben County N York

Letters-Patent.

The Schedule referred to in these Letters Patent and making part of the same containing a descrip-
tion in the words of the said Hezekiah Thurber himself of his improvement in the Machine
for Washing Clothes

Be it known. That I Hezekiah Thurber of the Town of Painted Post, Steuben Coun-
ty and State of New York have made an improvement in the machine for Washing Clothes
which is described as follows. This Washing machine consists of the following princi-
parts. 1 The water tight Box. 2 The Barrel or cylinder for holding the clothes. 3 The stand.
1 The Water tight Box is constructed by framing together by dove tailing nailing &c two end
pieces about twenty two inches long and about the same depth 1 inch thick. to two side pie-
ces about 2 feet long 11 inches wide and 1 inch thick. having a curved part made of
wood or metal forming the bottom and corresponding with the curvature of the barrel to be here-
after described. The whole is moved and made perfectly water tight. There is a plug or cock
at the end & near the bottom for drawing off the water — 2 The Barrel or Cylinder. The
interior of the barrel is a parallelogram formed by uniting together two end pieces about
15 inches square. and one inch connected by 11 slats or bars about 20 inches long &
7 1/2 inches wide 3/4 inch thick and perforated with a sufficient number of holes 1 1/4 inch
in diameter. On the outside are four Buckets one over each of the perforated slats. for rais-
ing the water. an axle passing thro the end of the water box is inserted into the end of the barrel
by means of which & a crank it is made to revolve on its axles in the curved Bottom & to
which it is adapted. There are also a number of bars with openings or boards perfo-
rated with holes to cover the other parts of the barrel, and between the perforated slats before
mentioned. One side of the barrel forms a moveable door for admitting and taking out
again the clothes to be washed. & is fastened in any convenient way. 3 The stand
is made by either fastening on legs to the water box or making it independent of the box.
Operation. The Clothes to be washed are inclosed in the barrel. the water and soap are put
into the water Box. the barrel is then turned with an irregular motion so as to raise the
clothes and let them fall again to the bottom. during this operation the water or suds is contin-
ually entering and pressing on the clothes thro the perforations in the barrel. A number of balls
of wood of about 2 inches in diameter are put in with the clothes which aid in the washing
[illegible] the clothes are sufficiently washed they are taken out of the Barrel and the water

376 X5930 drawn off. What I claim as my invention is the construction and application of the several parts of the before described Machine & the manner of using it. Further to illustrate my invention I refer to the model & drawing of the same deposited in the Patent Office In Testimony that the foregoing is a true Specification of my invention I have made oath to the same and signed my name before two Witnesses at the City of Washington this 12th day of April 1830

Hezekiah Thurber

Exd. Witnesses
[illegible] E. F. Gilbert
T. Barnes

[ 629 [illegible]